US008335474B2

(12) United States Patent  
Huttunen et al.

(10) Patent No.: US 8,335,474 B2  
(45) Date of Patent: Dec. 18, 2012

(54) CORRELATION-BASED DETECTION IN A COGNITIVE RADIO SYSTEM

(75) Inventors: Anu Huttunen, Tampere (FI); Visa Koivunen, Espoo (FI); Jarmo Rafael Lundén, Espoo (FI)

(73) Assignee: Nokia Corporation, Espoo (FI)

( * ) Notice: Subject to any disclaimer, the term of this patent is extended or adjusted under 35 U.S.C. 154(b) by 992 days.

(21) Appl. No.: 12/322,255

(22) Filed: Jan. 30, 2009

(65) Prior Publication Data

US 2009/0197550 A1      Aug. 6, 2009

Related U.S. Application Data

(60) Provisional application No. 61/063,349, filed on Feb. 1, 2008.

(51) Int. Cl.  
*H04B 15/00*      (2006.01)

(52) U.S. Cl. .......................................... 455/62; 375/343

(58) Field of Classification Search .................. 455/501, 455/516, 62, 63.1, 67.11, 67.13, 130, 226.1; 375/259, 260, 261, 343, 348, 349

See application file for complete search history.

(56) References Cited

U.S. PATENT DOCUMENTS

| | | | | |
|---|---|---|---|---|
| 2009/0163143 | A1* | 6/2009 | De Rore | 455/63.1 |
| 2011/0045776 | A1* | 2/2011 | Laroia et al. | 455/63.1 |
| 2011/0249776 | A1* | 10/2011 | Zeng et al. | 375/343 |
| 2012/0008698 | A1* | 1/2012 | Ktenas et al. | 375/259 |

FOREIGN PATENT DOCUMENTS

EP      1691515      8/2006

OTHER PUBLICATIONS

Young A et al: "Robust Adaptive Matched Subspace Cfar Detector for Gaussian Signal" Acoustics, Speech and Signal Processing, May 14-19, 2006, pp. 265-268, XP031386653.

Oner M et al: "Extracting the channel allocation information in a spectrum pooling system exploiting cyclostationarity" Personal Indoor and Mobil Radio Communications, vol. 1, Sep. 5-8, 2004, pp. 551-555, XP010754662.

Peter J. Green et al: "A Real Time Cognitive Radio Test Platform for Public Safety Physical Layer Experiments" IEEE International Symposium on Personal Indoor and Mobile Radio Communications, Sep. 1, 2007, pp. 1-5, XP031168283.

Belloni F. et al: "Unitary root-music technique for uniform circular array" Signal Processing and Information Technology, Dec. 14, 2003, pp. 451-454, XP010729189.

(Continued)

*Primary Examiner* — Thanh Le  
(74) *Attorney, Agent, or Firm* — Harrington & Smith

(57) ABSTRACT

A user equipment senses a plurality of wireless signals it receives; estimates cyclic correlation of the received signals using a multi-variate sign function; determines from the estimated cyclic correlation which ones of the signals are detected based on cyclostationarity present at known cyclic frequencies; and a frequency resource is selected for opportunistic communications based on the frequencies over which were received the signals that were determined to be detected. In specific embodiments, the multi-variate sign function is bivariate; the detected signals are primary user signals and the selected frequency resource avoids frequencies on which they were received; and/or the detected signals are secondary user signals and the selected frequency resource can either avoid those frequencies on which they were received or use those frequencies for the UE's own opportunistic communications.

18 Claims, 9 Drawing Sheets

OTHER PUBLICATIONS

Lundén J et al: "Nonparametric Cyclic Correlation Based Detection for Cognitive Radio System" Cognitive Radio Oriented Wireless Networks and Communications, May 15, 2008, pp. 1-6, XP031285127.

K. L. Blackard, T. S. Rappaport, and C. W. Bostian, "Measurements and Models of Radio Frequency Impulsive Noise for Indoor Wireless Communications," *IEEE J. Select. Areas Commun.*, vol. 11, No. 7, pp. 991-1001, Sep. 1993.

M. G. Sanchéz, L. de Haro, M. Calvo, A. Mansilla, C. Montero, and D. Oliver, "Impulsive Noise Measurements and Characterization in a UHF Digital TV Channel," *IEEE Trans. Electromagn. Compat.*, vol. 41, No. 2, pp. 124-136, May 1999.

A. V. Dandawaté and G. B. Giannakis, "Statistical Tests for Presence of Cyclostationarity," *IEEE Trans. Signal Process.*, vol. 42, No. 9, pp. 2355-2369, Sep. 1994.

J. Lundén, V. Koivunen, A. Huttunen and H. V. Poor, "Spectrum Sensing in Cognitive Radios Based on Multiple Cyclic Frequencies," in *Proc. 2nd Int. Conf. on Cognitive Radio Oriented Wireless Networks and Communications*, Orlando, FL, USA, Jul. 31-Aug. 3, 2007.

J. Lundén, V. Koivunen, A. Huttunen and H. V. Poor, "Censoring for Collaborative Spectrum Sensing in Cognitive Radios," in *Proc. 41st Asilomar Conference on Signals, Systems, and Computers*, Pacific Grove, CA, USA, Nov. 4-7, 2007.

T. E. Biedka, L. Mili, and J. H. Reed, "Robust Estimation of Cyclic Correlation in Contaminated Gaussian Noise," in*Proc. 29th Asilomar Conf. on Signals, Systems, and Computers*, vol. 1, Pacific Grove, CA, USA, Oct. 30-Nov. 2, 1995, pp. 511-515.

S. A. Kassam, "Nonparametric Signal Detection," in*Advances in Statistical Signal Processing*, H. V. Poor and J. B. Thomas, Eds., vol. 2, pp. 66-91, JAI Press Inc., 1993.

S. Visuri, V. Koivunen, and H. Oja, "Sign and Rank Covariance Matrices," *J. Statistical Planning and Inference*, vol. 91, No. 2, pp. 557-575, Dec. 2000.

W. A. Gardner, R. S. Roberts, "One-Bit Spectral-Correlation Algorithms," *IEEE Trans. Signal Process.*, vol. 41, No. 1, pp. 423-427, Jan. 1993.

M. Öner and F. Jondral, "Air Interface Identification for Software Radio Systems," *Int. J. Electron. Commun.*, vol. 61, No. 2, pp. 104-117, Feb. 2007.

I. S. Reed, "On the use of Laguerre Polynomials in Treating the Envelope and Phase Components of Narrow-Band Gaussian Noise," *IRE Trans. Inform. Theory*, vol. IT-5, pp. 102-105, Sep. 1959.

G. Jacovitti and A. Neri, "Estimation of the Autocorrelation Function of Complex Gaussian Stationary Processes by Amplitude Clipped Signals," *IEEE Trans. Inform. Theory*, vol. 40, No. 1, pp. 239-245, Jan. 1994.

\* cited by examiner

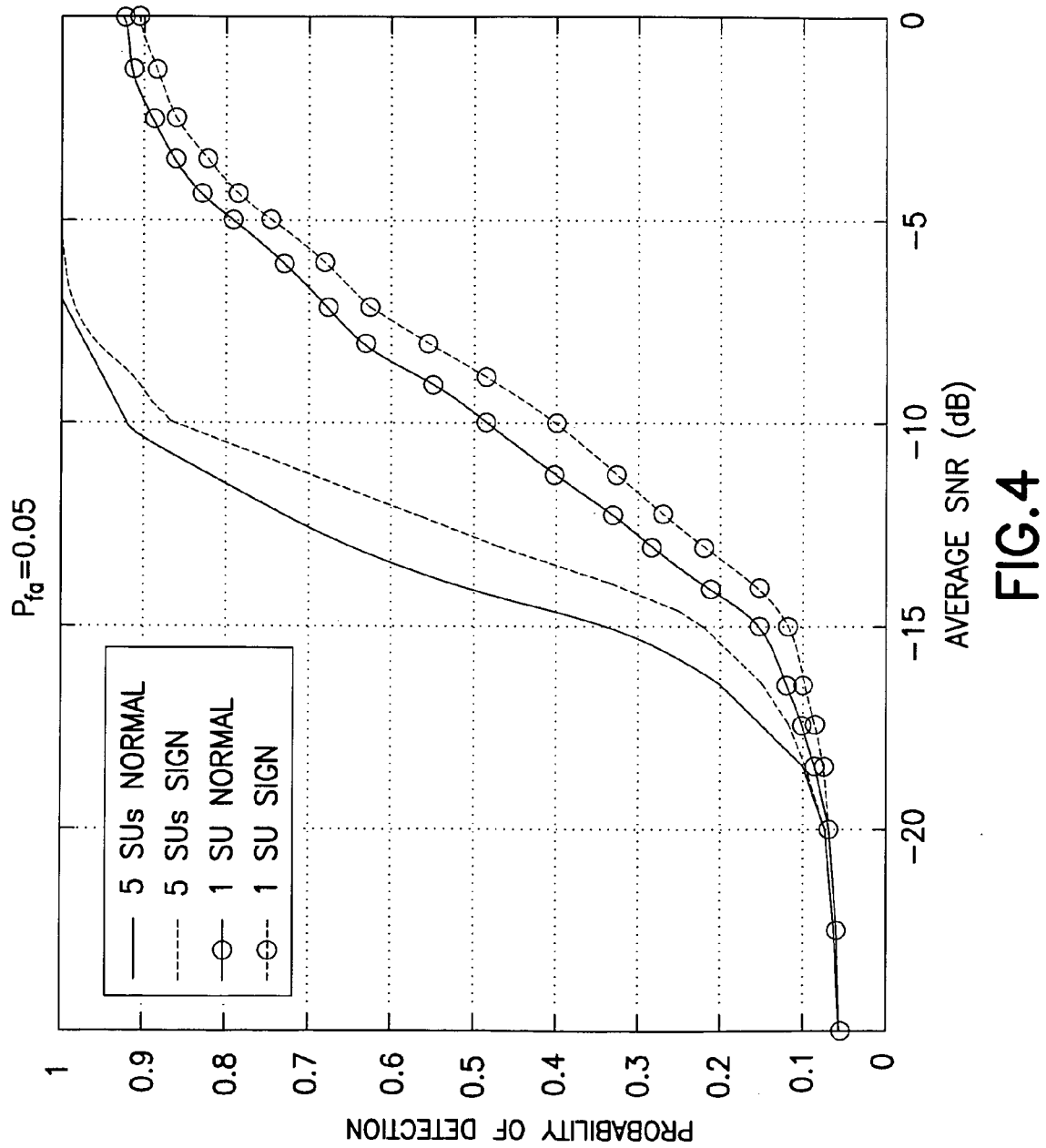

CORRELATION-BASED DETECTION IN A COGNITIVE RADIO SYSTEM

CROSS REFERENCE TO RELATED APPLICATION

This patent application claims priority under 35 U.S.C. §119(e) from U.S. Provisional Patent Application No. 61/063,349, filed Feb. 1, 2008, which is incorporated by reference herein in its entirety including exhibits thereof.

TECHNICAL FIELD

The teachings herein relate generally to wireless networks and devices such as cognitive radios that operate to sense spectrum to determine unused spectrum which they may opportunistically use while avoiding interference with primary users.

BACKGROUND

Underutilization of many parts of radio frequency spectrum has increased the interest in dynamic spectrum allocation. Cognitive radios have been suggested as an enabling technology for dynamic allocation of spectrum resources. Spectrum sensing used for finding free spectrum that can then be used in an opportunistic manner is a key task in cognitive radio systems. It enables agile spectrum use and interference control. Recently, there has been increasing interest on developing low complexity, robust and reliable spectrum sensing methods for detecting the presence of primary users such as cellular and WLAN subscribers, with whom the cognitive radio secondary users are obligated to avoid interfering. Primary users operate in networks that have radio resources (time and frequency) allocated by regulatory bodies. Often the individual primary user equipments (UEs) have specifically allocated radio resources for their transmissions and receptions. Cognitive radio networks use spectrum in an opportunistic manner and thus rely on spectrum sensing to find holes in the spectrum for their transmissions which will avoid interfering with the primary users. Collaborative sensing by multiple secondary users allows for mitigating the effects of propagation, e.g., shadowing and fading. Regardless of the bandwidth that the spectrum sensing task investigates, spectrum sensing must be designed to use low power so that the spectrum sensing task does not inordinately deplete the portable power supply of the mobile stations.

Some spectrum sensing algorithms exploit the cyclostationarity property of communication signals. Cyclostationarity allows for detecting communication signals even at the low signal-to-noise ratio regime. It also facilitates distinguishing among co-existing communication signals and systems. These algorithms do not require any explicit assumptions on the data or noise distributions. They are based solely on the asymptotic distributions of the cyclic correlation estimators. Nevertheless, these algorithms are not necessarily highly robust in the face of noise and interference. For example, in case the actual noise distribution has heavier tails than a normal distribution, the convergence of the classical cyclic correlation estimator slows down significantly and the performance of the algorithms deteriorates or they may even fail. In practice, a significantly larger number of observations would be needed, as compared to the case of Gaussian distributed noise, in order to achieve a similar performance level as these algorithms would attain in the presence of additive white Gaussian noise (AWGN) only.

Conventional cyclostationarity based detectors have been proposed for example in a paper by A. V. Dandawate & G. B. Giannakis, "STATISTICAL TESTS FOR PRESENCE OF CYCLOSTATIONARITY" (IEEE Transactions on Signal Processing, Vol. 42, No. 9, pp. 2355-2369, 1994). Similar subject matter is discussed in a paper by J. Lunden, V. Koivunen, A. Huttunen, H. V. Poor, entitled "SPECTRUM SENSING IN COGNITIVE RADIOS BASED ON MULTIPLE CYCLIC FREQUENCIES" (Proceedings of $2^{nd}$ International Conference on Cognitive Radio Oriented Wireless Networks and Communications, Orlando, Fla., Jul. 31-Aug.3, 2007).

These and related detection techniques based on cyclostationarity use direct sample estimates of cyclostationary statistics. Hence, they are not robust in the face of heavy-tailed noise or interference. One attempt to improve the robustness is described in a paper by T. E. Biedka, L. Mili, J. H. Reed, entitled "ROBUST ESTIMATION OF CYCLIC CORRELATION IN CONTAMINATED GAUSSIAN NOISE" (Proceedings of $29^{th}$ Asilomar Conference on Signals, Systems and Computers, Pacific Grove, Calif., pp. 511-515, 1995). This paper describes using the M-estimation principle. M-estimation is a semi-parametric estimation technique that makes assumptions on the family of distribution for noise but allows small departures from the exact probability model. M-estimation techniques bound the influence of highly deviating observations (outliers) by using a specific bounded score function called Huber's $\Psi$-function that effectively gives smaller weight to observations that are outliers and have a large influence on the resulting estimate. The M-estimation methods typically require high complexity iterative computations as well as estimation of nuisance parameters such as scale in a robust manner.

Non-parametric statistical procedures make no assumptions on the distribution family. Further background to the teachings presented herein may be seen at the following references: S. A. Kassam, "SIGNAL DETECTION IN NON-GAUSSIAN NOISE" (Springer-Verlag, 1988): S. Visuri, V. Koivunen, H. Oja, entitled "SIGN AND RANK COVARIANCE MATRICES" (Journal of Statistical Planning and Inference, Vol. 91, No. 2, pp. 557-575, 2000); and W. A. Gardner, R. S. Roberts, "ONE-BIT SPECTRAL CORRELATION ALGORITHMS" *IEEE Transactions on Signal Processing, Vol.* 41. *No* 1. pp, 423-427, 1993.

SUMMARY

In accordance with an exemplary embodiment of the invention there is a method comprising: sensing a plurality of wireless signals received at a receiver; estimating cyclic correlation of the received signals using a multi-variate sign function; determining from the estimated cyclic correlation which ones of the signals are detected based on cyclostationarity present at known cyclic frequencies; and based on the frequencies over which were received the signals that were determined to be detected, selecting a frequency resource for opportunistic communications. In a particular embodiment, the selected frequency resource avoids the frequencies over which were received the detected signals; the opportunistic communications occur where other signals are not detected.

In accordance with another exemplary embodiment of the invention there is an apparatus comprising a receiver, a detector and a processor. The receiver is configured to sense a plurality of wireless signals. The detector is configured to estimate cyclic correlation of the received signals using a multi-variate sign function, and to determine from the estimated cyclic correlation which ones of the signals are detected based on cyclostationarity present at known cyclic frequencies. The processor is configured to select a frequency resource for opportunistic communications based on the frequencies over which were received the signals that the detector determined are detected. In a particular embodiment, the processor selects the frequency resource to avoid the frequencies over which were received the detected signals; the opportunistic communications occur where other signals are not detected.

In accordance with yet another exemplary embodiment of the invention there is a computer readable memory storing a program of computer executable instructions that when executed by a processor result in actions comprising: sensing a plurality of wireless signals; estimating cyclic correlation of the received signals using a multi-variate sign function; determining from the estimated cyclic correlation which ones of the signals are detected based on cyclostationarity present at known cyclic frequencies; and based on the frequencies over which were received the signals that were determined to be detected, selecting a frequency resource for opportunistic communications.

In accordance with still another exemplary embodiment of the invention there is an apparatus comprising receiving means and detecting means and selecting means. The receiving means is for sensing a plurality of wireless signals. The detecting means is for estimating cyclic correlation of the sensed signals using a multi-variate sign function, and for determining from the estimated cyclic correlation which ones of the signals are detected based on cyclostationarity present at known cyclic frequencies. The selecting means for selecting a frequency resource for opportunistic communications based on the frequencies over which were received the signals that the detector determined are detected. In a particular embodiment, the receiving means comprises a receiver, the detecting means comprises a non-parametric spectrum sensing detector, and the selecting means comprises a processor.

BRIEF DESCRIPTION OF THE DRAWINGS

FIG. 4 is a plot of probability of detection versus average SNR for 1 to 5 secondary users in a flat fading Gaussian channel with Gaussian noise, comparing a classical cyclic correlation estimator with a non-parametric sign estimator according to an embodiment of the invention using an OFDM signal.

DETAILED DESCRIPTION

In order to improve the robustness of the spectrum sensing detector in the face of noise and interference, a non-parametric detector for cyclostationary signals is introduced by these teachings. By designing non-parametric detectors for cyclostationary signals, highly robust performance is obtained regardless of the noise distribution. The inventors have determined that such detectors also use the data highly efficiently, and are close to optimal in many practical scenarios. Consequently, only few additional observations are needed in order to achieve similar performance even in a nominal Gaussian case. In the case of heavy-tailed noise distributions, significantly fewer observations are needed as compared to conventional cyclostationarity-based algorithms for a similar performance level.

According to these teachings is a cyclic correlation estimator based on multivariate generalization of the sign function. In the case of complex signals, real and imaginary parts of the signal form a bivariate signal. It will be shown below that the cyclostationarity property used in the detector is preserved under complex sign function. These detection methods are based on non-parametric statistics making them highly attractive in real applications where noise and interference statistics may not be fully known or are not accurately specified. They are highly robust and use the data efficiently. This means that only a small percentage of additional observations is needed in order to achieve a performance similar to an optimal method. No additional nuisance parameters such as scale (variance) need to be estimated, which is an improvement over the robust methods that are based on M-estimation and summarized above in background. Furthermore, non-parametric detectors achieve a fixed false alarm rate under all conditions satisfying the non-parametric null hypothesis. Non-parametric methods are highly efficient, i.e. they lead to performance that is close to optimal, especially in multi-variate problems.

Figure 1A:
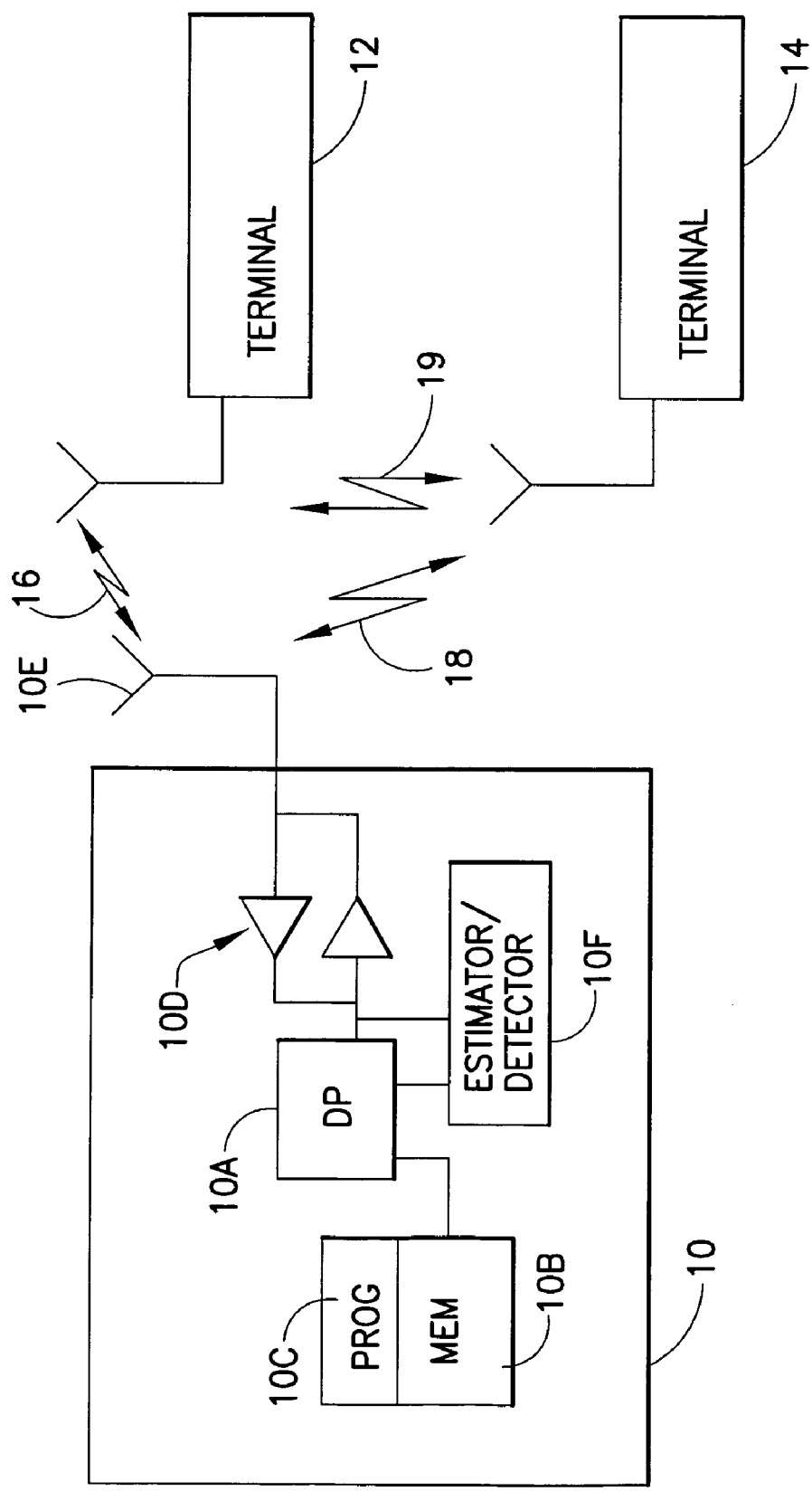
FIG. 1A is a simplified block diagram of various electronic devices that are suitable for use in practicing the exemplary embodiments of this invention.

Reference is now made to FIG. 1 for illustrating a simplified block diagram of various electronic devices that are suitable for use in practicing the exemplary embodiments of this invention. FIG. 1 shows a high level block diagram of three cognitive radio terminals 10, 12, 14. These cognitive radio terminals 10, 12, 14, operate on an opportunistic basis in spectrum bands that are found underutilized by a spectrum sensing functionality. The first cognitive radio terminal 10 includes a data processor (DP) 10A, a memory (MEM) 10B that stores a program (PROG) 10C, and a suitable radio frequency (RF) transceiver 10D coupled to one or more antennas 10E (one shown at FIG. 1A) for bidirectional wireless communications over one or more wireless links 16, 18 with the other cognitive users 12, 14. A separate cyclic correlation estimator/non-parametric detector 10F is shown at the first terminal 10, which in various implementations may be embodied as hardware within the receiver portion of the transceiver 10D, as an application specific integrated circuit ASIC (which may be within the transceiver 10D such as a RF front end chip or separate from that chip as illustrated), or within the main DP 10A itself. Also shown in FIG. 1A is a link 19 between those other two cognitive radio terminals 12, 14. It is understood that the other terminals 10, 12 also have similar hardware as is shown for the first terminal 10, and they may or may not find their spectrum holes using non-parametric detectors for cyclostationary signals according to these teachings. The terminals 10, 12, and 14 can also perform collaborative spectrum sensing by measuring the same spectrum bands, analyzing the measured data and sharing the analyzed results.

Figure 2:
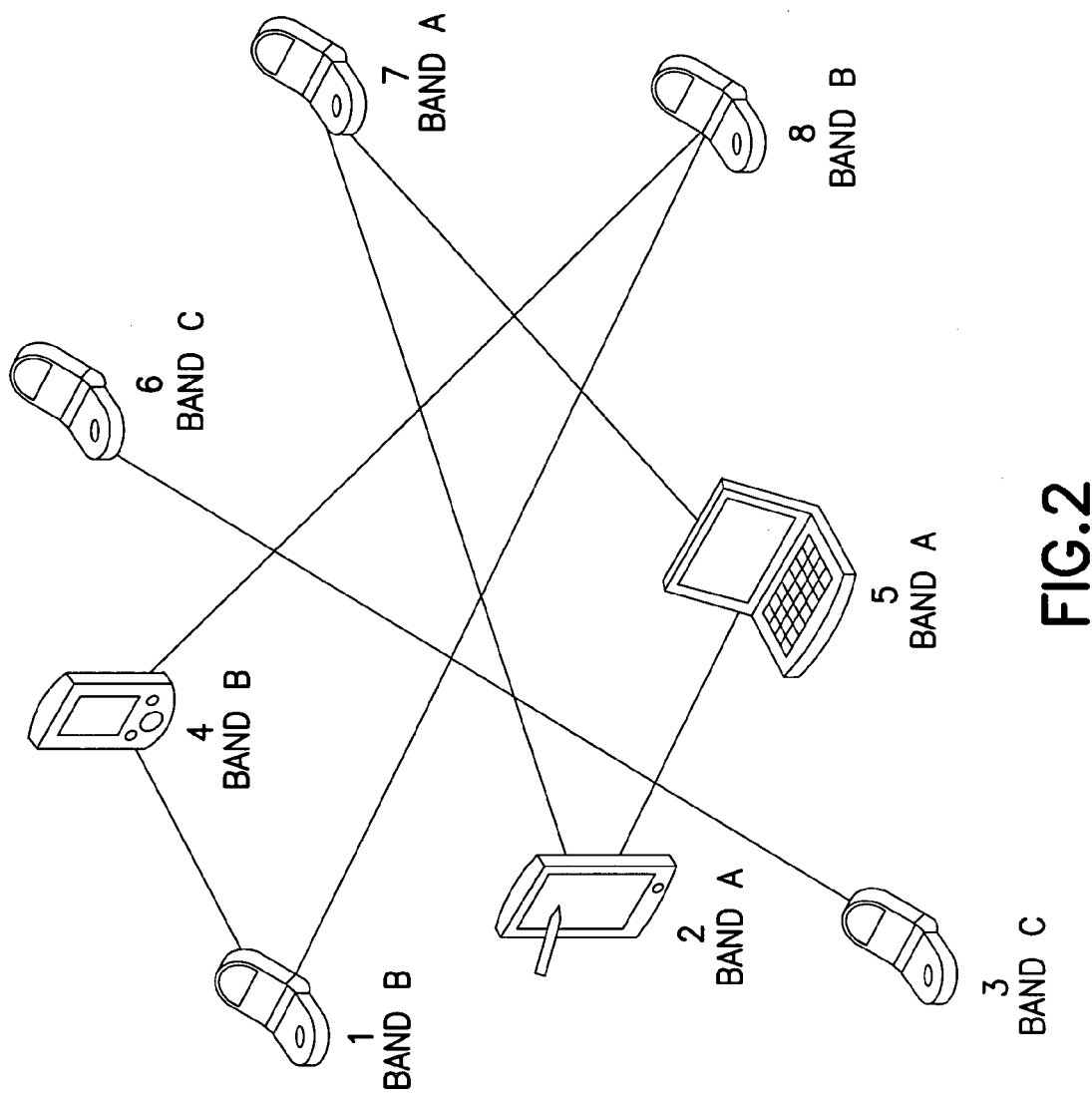
FIG. 2 illustrates constellations of terminals wherein different subsets of the terminals operate in different bands, at least one of which is found by spectrum sensing.

Generally, the spectrum sensing functions detailed herein are executed within the DP 10A/detector 10F using the transceiver 10D and antenna 10E of the UE 10. Once spectrum is sensed and a 'hole' is found, the UE 10 may communicate with the other cognitive radios 12, 14 as may be allowed in the cognitive radio system. The detection techniques detailed herein are for the cognitive radio 10 to sense signals of the primary users, which in FIG. 2 are the users on Bands A and B. If the cognitive user determines that there is cyclostationarity present at the appropriate cyclic frequencies in the signal that it analyzes, then the cognitive terminal concludes that the signal is from a primary user. The cyclostationarity properties of primary user signals are typically known in advance, or they may be reliably estimated from a sample signal. In this manner the cognitive users 10, 12, 14 can know those portions of the spectrum that the primary users are currently occupying, and tailor the time and frequencies of their own opportunistic communications with other cognitive users to avoid interfering with those primary users.

"Appropriate" cyclic frequencies may be cyclic frequencies characteristic of a primary wireless communication system (e.g., GSM, UTRAN, E-UTRAN, etc.) or they may be cyclic frequencies characteristic of secondary users (other cognitive users), or some combination of both may be used to analyze the various signals the UE receives. These appropriate cyclic frequencies are known to the UE which analyzes cyclostationarity of the signals it receives, and this knowledge may be from knowing frequencies published (on a broadcast channel for example) which are in use for a traditional hierarchical (e.g., primary) wireless system and/or stored beforehand to a database in the memory of the UE and/or by sensing signals that are determined to be from secondary users because they do not match up against the known primary-system cyclic frequencies.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the PROGs 10C is assumed to include program instructions that, when executed by the associated DP, enable the electronic device to operate in accordance with the exemplary embodiments of this invention, as detailed above. Inherent in the DP 10A is a clock (oscillator) to enable synchronism among the various apparatus for transmissions and receptions within the appropriate time intervals and slots required.

The PROG 10C may be embodied in software, firmware and/or hardware, as is appropriate. In general, the exemplary embodiments of this invention may be implemented by computer software stored in the MEM 10B and executable by the DP 10A of the cognitive radio terminal/user equipment 10, or by hardware, or by a combination of software and/or firmware and hardware in any or all of the devices shown.

In general, the various embodiments of the cognitive radio terminal/UE 10 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions and sensor networks.

The MEM 10B may be of any type suitable to the local technical environment and may be implemented using any suitable data storage technology, such as semiconductor-based memory devices, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multi-core processor architecture, as non-limiting examples.

Figure 1B:
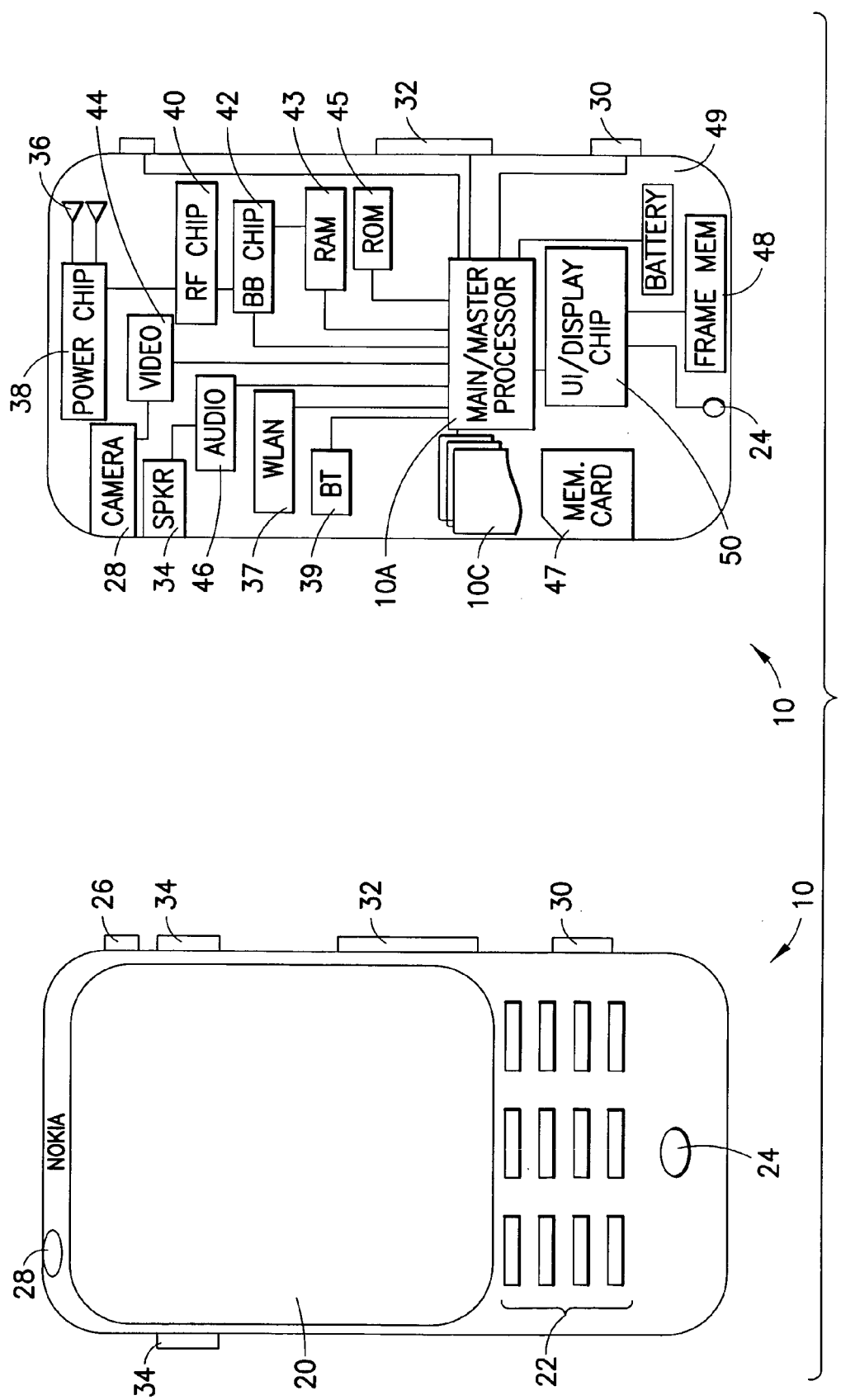
FIG. 1B is a more detailed schematic diagram of a user equipment such as a terminal of FIG. 1A operating as a cognitive radio in accordance with an exemplary embodiment of the invention.

FIG. 1B illustrates further detail of an exemplary UE in both plan view (left) and sectional view (right), and the invention may be embodied in one or some combination of those more function-specific components.

Within the sectional view of FIG. 1B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50 may operate in a slave relationship to the main processor 10A which may then be in a master relationship to them. Embodiments of this invention are most relevant to the baseband chip 42 where the signals are evaluated for cyclic correlation and cyclostationarity after the received signal is downconverted, though it is noted that other embodiments need not be disposed there but may be disposed across various chips and memories as shown or disposed within another processor that combines some of the functions described above for FIG. 1B. Any or all of these various processors of FIG. 1B access one or more of the various memories, which may be on-chip with the processor or separate therefrom.

Note that the various chips (e.g., 38, 40, 42, etc.) that were described above may be combined into a fewer number than described and, in a most compact case, may all be embodied physically within a single chip.

While less relevant to spectrum sensing, the following components of FIG. 1B are detailed for completeness. The exemplary UE 10 includes a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker (s) 34 when the camera 28 is not in an active mode. Signals to and from the camera 28 pass through an image/video processor 44 which encodes and decodes the various image frames, and a separate audio processor 46 may also be present controlling signals to and from the speakers 34 and the microphone 24. A graphical display interface 20 is refreshed from a frame memory 48 as controlled by a user interface chip 50 which may process signals to and from the display interface 20 and/or additionally process user inputs from the keypad 22 and elsewhere.

FIG. 2 is a simple schematic illustration of a cognitive radio environment. Assume for example that band A is cellular and band B is WLAN. Three of the apparatus illustrated at FIG. 2 (numbers 2, 5 and 7) are operating as subscribers on the cellular band A, and three other apparatuses (numbers 1, 4 and 8) are operating as subscribers on a WLAN network using band B, which is frequency-separated from band A. Those six users are the primary users which the cognitive radios seek to avoid interference with. All users in FIG. 2 operate in the same geographic cell or user area. UE #s 3 and 6 are in the position of the terminals 10, 12 and 14 of FIG. 1 as the cognitive radio secondary users, and they seek to communicate also (with one another directly or with other parties) but are not subscribers on either network. Each engages in spectrum sensing to find opportunistic frequency resources on which to conduct their communications without interfering with the primary users already on band A and band B. These opportunistic 'holes' arise and fade as time passes since traffic on the other bands A and B varies over time, and so UE #s 3 and 6 must continue to engage in spectrum sensing in order to keep up their communications as secondary users. UE numbers 3 and 6 may perform spectrum sensing individually or in collaboration with each other.

Certain prior art robust cyclic correlation estimators stem from M-estimation. Both M-estimators as well as a trimmed mean estimator are found to reduce the influence of outliers (highly deviating observations). Detailed herein is a cyclic correlation estimator based on complex generalization of the sign function. It is shown that the cyclostationarity property used in the detector is preserved under sign function. Asymptotic distribution of the estimator under the null hypothesis is derived below. The test statistics for single-user and collaborative spectrum sensing schemes are also shown. Exemplary embodiments of this invention are based on nonparametric statistics making them highly attractive in real applications where noise and interference statistics may not be fully known. No additional nuisance parameters such as scale need to be estimated. Furthermore, nonparametric detectors according to the exemplary embodiments achieve a fixed false alarm rate under all conditions satisfying the nonparametric null hypothesis.

Testing within the UE 10 for the presence of a second-order cyclostationary signal can be seen as testing whether the estimated sign cyclic correlation $\hat{R}_S(\alpha, \tau)$ is different from zero for the cyclic frequencies of the signal that is received. The symbol $\alpha$ is the cyclic frequency of interest or set of cyclic frequencies of interest. Hence, the hypothesis testing problem for testing the presence of a second-order cyclostationary signal for a given cyclic frequency $\alpha$ may be formulated as follows, where $H_0$ indicates that no primary user signal is present and $H_1$ indicates that a primary user signal is present:

$$H_0: \hat{r}_S(\alpha) = \epsilon(\alpha), \forall \{\tau_n\}_{n=1}^N$$
$$H_1: \hat{r}_S(\alpha) = r_s(\alpha) + \epsilon(\alpha), \text{ for some } \{\tau_n\}_{n=1}^N \quad [1]$$

where $\epsilon(\alpha)$ is the estimation error and $\hat{r}hd\ S(\alpha)$ is a vector containing the estimated sign cyclic correlations for different time delays $\tau_1, \ldots, \tau_N$ $$\hat{r}_S(\alpha) = [\hat{R}_S(\alpha, \tau_1), \ldots, \hat{R}_S(\alpha, \tau_N)]^T \quad [2]$$

If instead of a primary user signal a secondary user signal is desired to be detected, the hypothesis test is formulated at the specified cyclic frequencies of the secondary user.

The sign cyclic correlation estimator is defined as $$\hat{R}_S(\alpha, \tau) = \frac{1}{M} \sum_{t=1}^{M} S(x(t)) S(x^*(t+\tau)) e^{-j2\pi\alpha t} \quad [3]$$

where M is the number of observations, $\alpha$ is the cyclic frequency, and the sign function S for complex valued data x is defined in the bivariate (here complex) case as $$S(x) = \begin{cases} \frac{x}{|x|}, & x \neq 0 \\ 0, & x = 0 \end{cases} \quad [4]$$

The test statistic for the sign cyclic correlation based test for a single secondary user (SU) is defined as $$\lambda = M |\hat{r}_S(\alpha)|^2 \quad [5]$$

Under the null hypothesis $\lambda$ is complex chi-square distributed with N degrees of freedom.

In the collaborative spectrum sensing mode, assuming conditional independence of the secondary users on whether the hypothesis H0 or H1 is true, the single-user test statistics can be combined as follows $$\lambda_L = \sum_{i=1}^{L} \lambda^{(i)} \quad [6]$$

where L is the number of collaborating secondary users and $\lambda^{(i)}$ denotes the sign cyclic correlation test statistic of the ith user. Under the null hypothesis $\lambda_L$ is complex chi-square distributed with LN degrees of freedom.

Now are shown a more complete derivation of the treatment at equations [1] through [6]. Define the sign cyclic correlation estimator as $$\hat{R}_S(\alpha, \tau) = \frac{1}{M} \sum_{t=1}^{M} S(x(t))S(x^*(t+\tau))e^{-j2\pi\alpha t}, \quad [7]$$

where M and $\alpha$ are as above. The periodicity of autocorrelation function is preserved for a circularly symmetric complex Gaussian process in spite of the sign function.

It may be assumed that the signal has zero mean, otherwise an estimate for the mean (using a robust estimator) has to be obtained and removed from the received signal before employing the estimator.

A symbol rate estimator can now be defined as $$\alpha_0 = \arg \max_{\alpha \in (0, \frac{1}{2}]} \|\hat{r}_S(\alpha)\|^2 \quad [8]$$

where $\|\cdot\|$ denotes the Euclidean vector norm and $\hat{r}_S(\alpha)$ is a vector containing the estimated sign cyclic correlations for different time delays $\tau_1, \ldots, \tau_N$. This leads to equation [2] above.

However, in order to define a constant false alarm rate (CFAR) test for the presence of cyclostationarity at a given cyclic frequency, the distribution of the estimator needs to be established. Below the distribution of the sign cyclic correlation estimator is determined for independent and identically distributed (i.i.d.) zero-mean circular noise process. Non-parametric performance is achieved for all i.i.d. circular zero-mean noise probability distribution functions. Note, however, that circularity is not required from the primary user signal.

Distribution of the cyclic sign correlation estimator: The number of observations M is typically large (in the order of several thousands) in cognitive radio applications. Hence, applying the central limit theorem to infer the distribution of the sign cyclic correlation estimator is well justified in a realistic scenario. According to the central limit theorem the distribution of the sign cyclic correlation estimator approaches normal distribution as M goes to infinity. Thus, a normal distribution approximation can be used for large M. Consequently, only the mean and the variance of the estimators need to be determined in order to fully specify the asymptotic distribution. Validity of the central limit theorem approximation is assessed by simulations detailed below.

It is assumed that $x(t)=n(t)$ where $n(t)$ is i.i.d. zero-mean circular noise process. That is, only noise is considered to be present. In that case, the mean of $\hat{R}_S(\alpha, \tau)$ is given by (assuming that $\tau \neq 0$):

$$E[\hat{R}_S(\alpha, \tau)] = \frac{1}{M} \sum_{t=1}^{M} E[S(n(t))S(n^*(t+\tau))]e^{-j2\pi\alpha t} \quad [9]$$

$$= \frac{1}{M} \sum_{t=1}^{M} E[S(n(t))]E[S(n^*(t+\tau))]e^{-j2\pi\alpha t}$$

$$= 0, \forall \alpha, \forall \tau \neq 0$$

where the second equality follows from independence of the noise samples. The last equality follows from the fact that noise is circular, i.e., $S(n(t)) = e^{j\theta}$ where $\theta$ has a uniform distribution between 0 and $2\pi$.

Since the mean of $\hat{R}_S(\alpha, \tau)$ is zero, the variance of $\hat{R}_S(\alpha, \tau)$ is given by:

$$\text{Var}(\hat{R}_S(\alpha, \tau)) = E[(\hat{R}_S(\alpha, \tau))(\hat{R}_S(\alpha, \tau))^*] \quad [10]$$

$$= E\left[\left(\frac{1}{M}\sum_{t=1}^{M} S(n(t))S(n^*(t+\tau))e^{-j2\pi\alpha t}\right) \cdot \left(\frac{1}{M}\sum_{t=1}^{M} S(n(t))S(n^*(t+\tau))e^{-j2\pi\alpha t}\right)^*\right]$$

$$= \frac{1}{M^2} \sum_{t=1}^{M} \sum_{k=1}^{M} E[S(n(t))S(n^*(k)) \cdot S(n^*(t+\tau))S(n(k+\tau))] e^{-j2\pi\alpha(t-k)}$$

$$= \frac{1}{M^2} \left( \sum_{t=1}^{M} E[|S(n(t))|^2 |S(n^*(t+\tau))|^2] + \sum_{t=1}^{M} \sum_{\substack{k=1 \\ k \neq t}}^{M} \underbrace{E[S(n(t))S(n^*(k))S(n^*(t+\tau))S(n(k+\tau))]}_{=0} \cdot e^{-j2\pi\alpha(t-k)} \right)$$

$$= \frac{1}{M}, \forall \alpha, \forall \tau \neq 0.$$

Hypothesis testing: Testing for the presence of a second-order cyclostationary signal can be seen as testing whether the estimated sign cyclic correlation $\hat{R}_S(\alpha, \tau)$ is different from zero or not for the cyclic frequencies of the signal. Hence, the hypothesis testing problem for testing the presence of a second-order cyclostationary signal for a given cyclic frequency $\alpha$ may be formulated as shown above at equation [1].

From the above "distribution" description, it follows that under the null hypothesis (assuming an i.i.d. circularly symmetric noise process)

$$\hat{R}_S(\alpha, \tau): N_C\left(0, \frac{1}{M}\right), \forall \alpha, \forall \tau \neq 0 \quad [11]$$

where $N_C(\cdot, \cdot)$ denotes the complex Normal distribution.

Defining the test statistic for the sign cyclic correlation based test for a single secondary user (SU) as in equation [5] above, then the null hypothesis is rejected if $\lambda > \gamma$ where $\gamma$ is the test threshold defined by $p(\lambda > \gamma | H_0) = p_{fa}$, in which $p_{fa}$ is the constant false alarm rate parameter of the test.

Under the null hypothesis, $\lambda$ is chi-square distributed with N complex degrees of freedom. The probability distribution function of a chi-square distributed random variable with N complex degrees of freedom is given by $$f(z) = \frac{1}{(N-1)!} z^{N-1} e^{-z}, \quad z > 0 \quad [12]$$

which is a gamma distribution with integer parameters N and 1.

In an embodiment of the invention the detector is a single cycle detector. However, wireless communication signals typically exhibit cyclostationarity at multiple cyclic frequencies. Multicycle extensions may be obtained as well in order to take into account the rich information present in wireless communication signals.

For the case of multiple secondary users, and assuming that the test statistics of the secondary users are independent given $H_0$ or $H_1$, the single-user test statistics can be combined as follows $$\lambda_L = \sum_{i=1}^{L} \lambda^{(i)} \qquad [13]$$

where L is the number of collaborating secondary users and $\lambda^{(i)}$ denotes the sign cyclic correlation test statistic of the ith user. Since the single-user test statistic $\lambda$ has a quadratic form it is the log-likelihood under the null hypothesis. Hence, the sum of the single-user test statistics in equation [13]. Under the null hypothesis $\lambda_L$ is chi-square distributed with LN complex degrees of freedom.

The performance of the proposed detection scheme is described below and with reference to FIGS. 3-7 which present simulations of a single cycle sign cyclic correlation based detector according to an embodiment of this invention as compared to the single cycle detectors proposed in [4] for both single and multiple secondary users. To summarize, the robustness of the non-parametric sign cyclic detector compared to the normal cyclic detector can be clearly seen with simulations in an impulsive noise environment. In nominal Gaussian noise conditions the performance loss is minimal and in some cases the performance may even be improved as compared to the normal cyclic detector, for example, when the noise or error distribution is heavy-tailed.

Figure 3A:
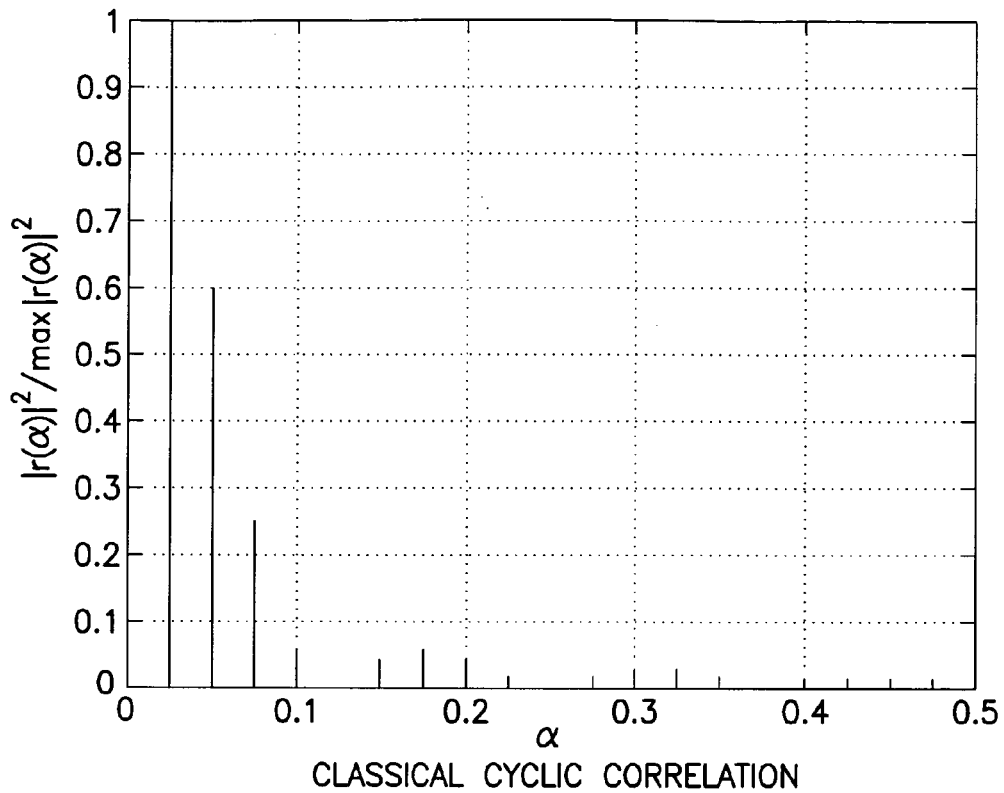
FIGS. 3A-3B show that for an OFDM signal with symbol frequency 0.025, sign non-linearity according to embodiments of this invention preserves the cyclic frequencies (FIG. 3B) as compared to classical cyclic correlation (FIG. 3B) of the same signal.
Figure 3B:
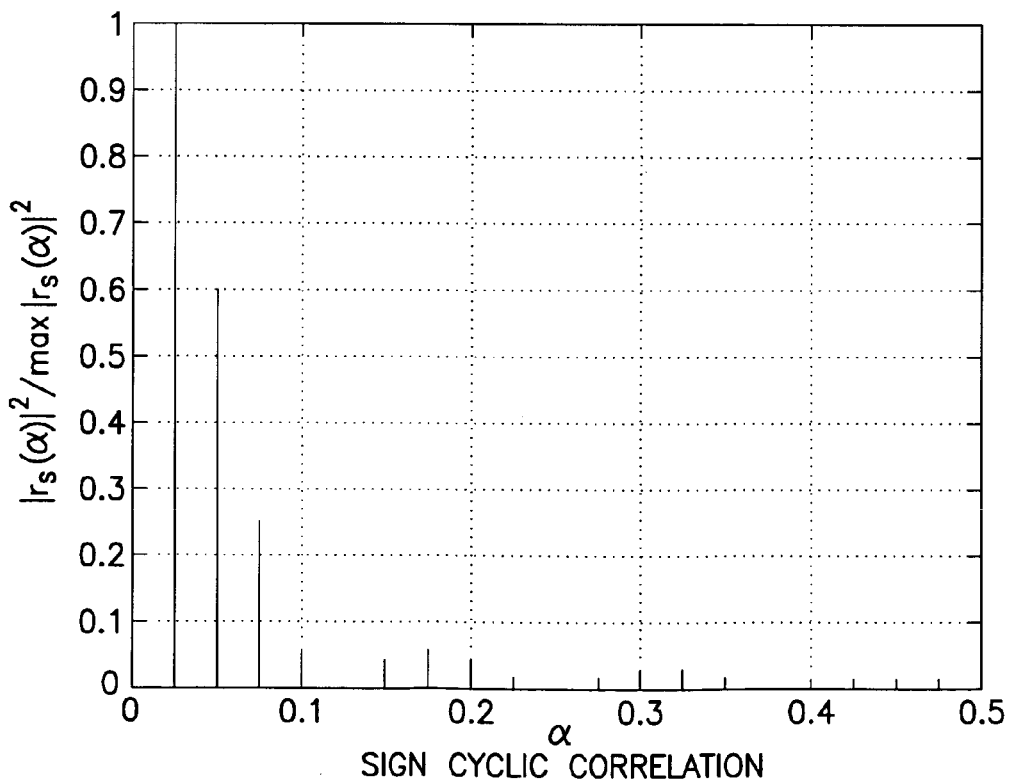

FIG. 3A-B use an example to show that sign non-linearity preserves the cyclic frequencies for an OFDM signal. The normalized squared modulus of the cyclic correlation for an OFDM signal for classical estimators is shown at FIG. 3A, and for sign estimators is shown at FIG. 3B. It can be seen that the cyclic frequencies are preserved by the sign non-linearity. The signal is an OFDM signal with symbol frequency of 0.025. The sign non-linearity preserves the cyclic frequencies.

The first test signal is an orthogonal frequency division multiplexing (OFDM) signal. The OFDM signal is a DVB-T signal with a Fast-Fourier transform (FFT) size $N_{FFT}=8192$ and a cyclic prefix of $N_{cp}=1024$ samples. The symbol length is defined as $T_S=N_{FFT}+N_{cp}$. Number of employed subcarriers is 6817. Subcarrier modulation was 64-QAM. The length of the signal is 3 OFDM symbols ($\approx$3 ms). The signal was sampled at the Nyquist rate. Thus, the oversampling factor with respect to the symbol rate is $N_{FFT}+N_{cp}$.

OFDM signal is cyclostationary with respect to the symbol frequency. Thus, the detection is performed at the symbol frequency. In addition, all the detectors employ two time lags $\pm N_{FFT}$.

FIG. 4 plots probability of detection vs. average SNR (dB) in a Rayleigh fading channel (ETSI EN 300 744 V1.5.1 (2004-11)) and additive white Gaussian noise for 1 and 5 secondary users, and illustrates the performance of the detectors in a Rayleigh fading channel as a function of the average signal-to-noise ratio (SNR). Additive noise is Gaussian. The signal is an OFDM signal (DVB-T). The SNR is defined as $$SNR = 10 \log_{10} \frac{\sigma_x^2}{\sigma_n^2}$$

where $\sigma_x^2$ and $\sigma_n^2$ are the variances of the transmitted signal and the noise, respectively. The channel is normalized to have an expected gain of 1. False alarm rate is 0.05 (the same false alarm rate is used in all of the following simulations, as well). All the simulation curves in the figures are averages over 1000 independent experiments. It can be seen that employing the sign non-linearity causes performance degradation, and that sign cyclic correlation based detectors suffer small performance degradation compared to methods based on classical cyclic correlation estimator in Gaussian noise for the OFDM signal.

Figure 5:
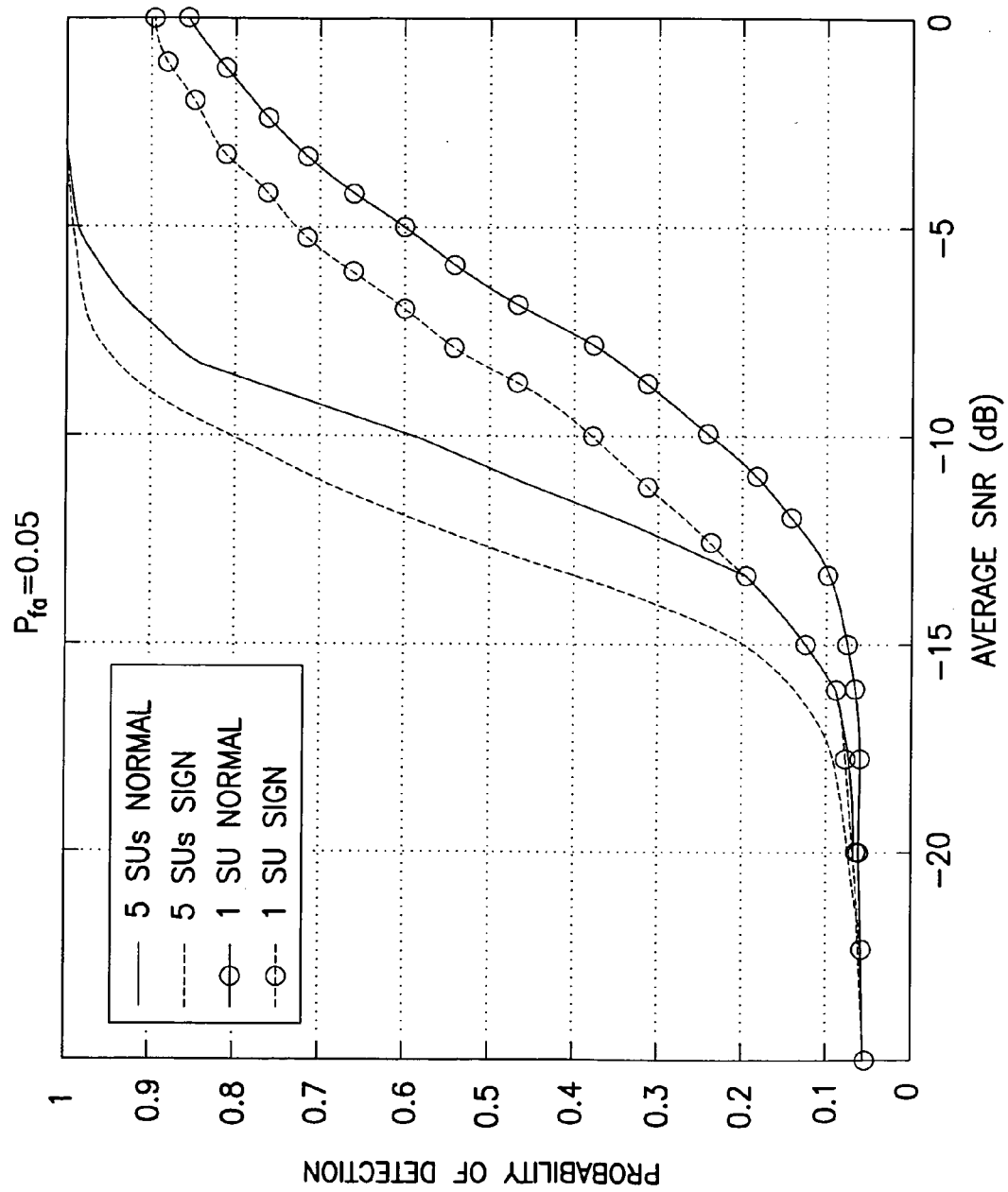
FIG. 5 is similar to FIG. 4 but where the additive noise has a contaminated Gaussian distribution.

FIG. 5 illustrates performances for the DVB-T signal in a more impulsive noise environment. FIG. 5 plots probability of detection vs. average SNR (dB) in a Rayleigh fading channel for 1 and 5 secondary users, in which additive noise has a contaminated Gaussian distribution $0.95N_C(0,\sigma^2)+0.05N_C(0,25\sigma^2)$. SNR is defined with respect to $\sigma^2$. The signal is an OFDM signal (DVB-T). It is seen that the non-parametric sign cyclic correlation based detectors are more robust against impulsive noise compared to the normal cyclic detector.

Figure 6:
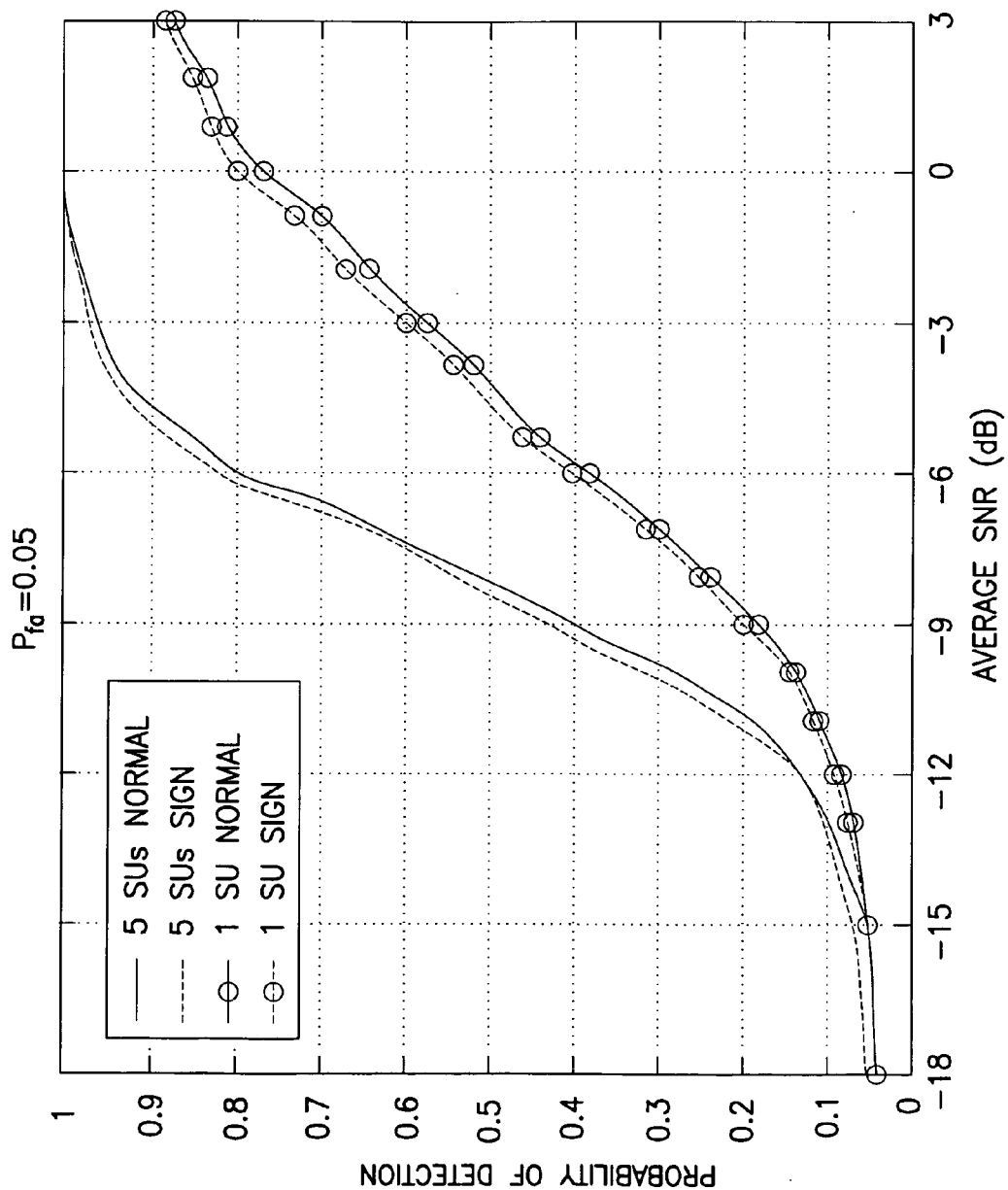
FIG. 6 is similar to FIG. 4 but for a QPSK signal with root raised-cosine pulse shaping.
Figure 7:
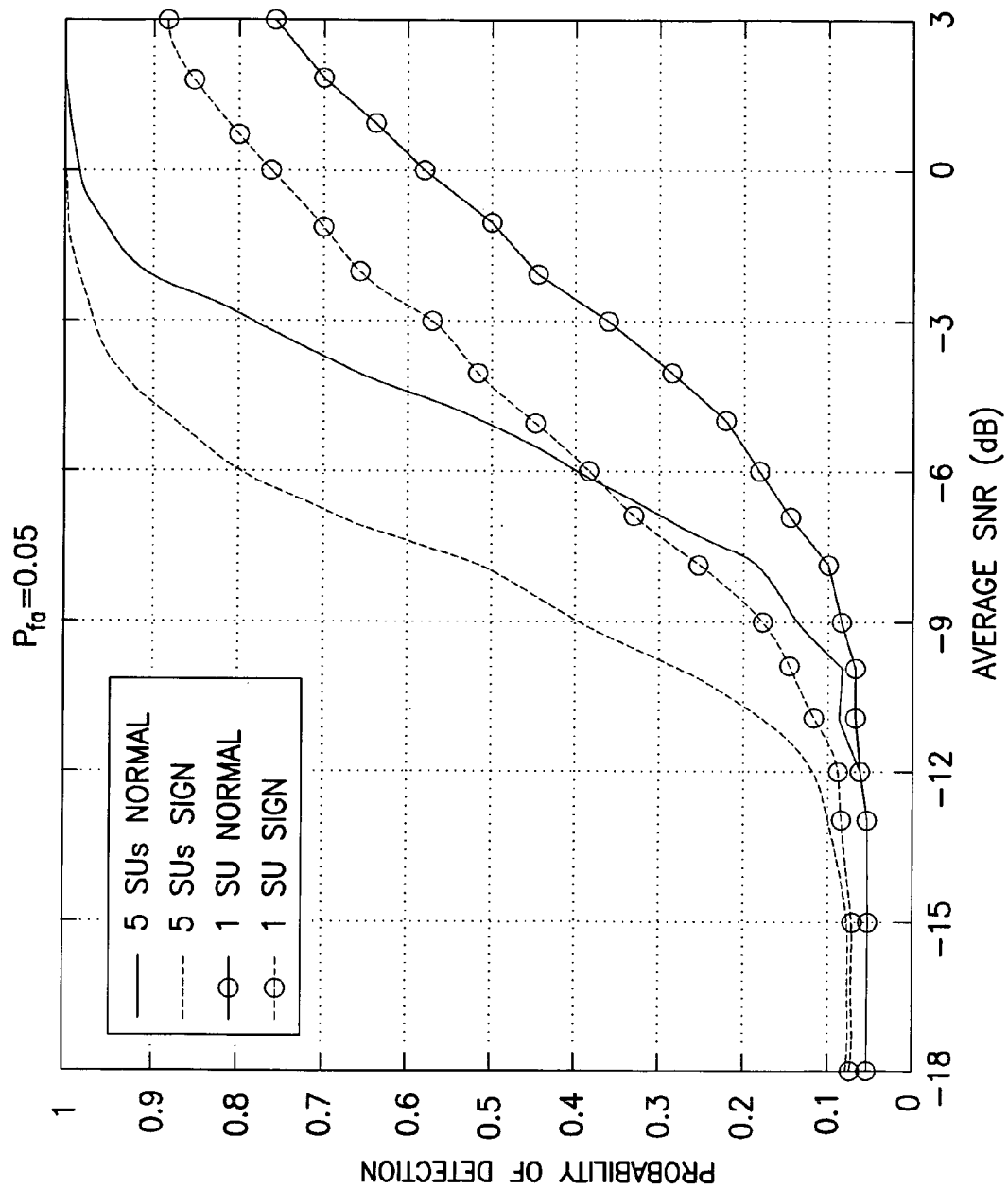
FIG. 7 is similar to FIG. 6 but where the additive noise has a contaminated Gaussian distribution

The second test signal used for FIGS. 6-7 is a quadrature phase shift keying (QPSK) signal with root raised-cosine pulse shaping with excess bandwidth of 0.2. The length of the signal was 1500 symbols. The signal was four times oversampled. Detection was performed at the symbol frequency using the following time delays $\pm 1,\pm 2$ samples.

FIGS. 6-7 depict the performances of the detectors for the QPSK signal in a frequency flat Rayleigh fading channel for Gaussian and contaminated Gaussian $0.95N_C(0,\sigma^2)+0.05N_C(0,25\sigma^2)$ noise distributions, respectively. In this case, the sign cyclic correlation detector outperforms the normal cyclic detector even in the non-impulsive noise environment. This is due to the fact that QPSK is a constant modulus signal. Hence, hard-limiting the amplitude does not result in information loss. Furthermore, unlike sign cyclic correlation based detector the conventional cyclic detector requires estimation of the covariance matrix of the estimator. This can be considered as nuisance parameter whose estimation may result in a small performance loss, especially, for small number of observations. In the impulsive noise environment the robustness of the sign cyclic correlation based detector is clearly observed.

In FIG. 6 it is seen that nonparametric sign cyclic correlation based detectors slightly outperform the methods based on classical cyclic correlation estimator even in Gaussian noise for the QPSK signal. In FIG. 7 due to the impulsive nature of the noise the robust sign cyclic correlation based spectrum sensing methods clearly outperform the methods based on a classical cyclic correlation estimator.

Specific embodiments of the complex sign-function based cyclic detector include the following technical aspects:

Improved performance under heavy-tailed noise compared to conventional cyclic detector which is frequently used in spectrum sensing studies.

Complex sign-operation preserves the phase information. This facilitates analyzing periodical components in signals.

No need to specify noise distribution or distribution family as in parametric or semi-parametric techniques.

Nonparametric detectors achieve a fixed false alarm rate under all conditions satisfying the nonparametric null hypothesis No need to estimate any nuisance parameters such as scale. M-estimators need such a step.

No need to perform complicated numerical optimization and iterative computation as typically required for M-estimation.

Complexity of implementation is reduced as compared to conventional cyclic detector.

It is noted that for certain embodiments slightly more observations may be needed in order to get equal performance to the optimum technique if the assumption of nominal error distribution is valid. However, for the optimum technique the noise distribution and its parameters have to be explicitly and accurately modelled.

Figure 8:
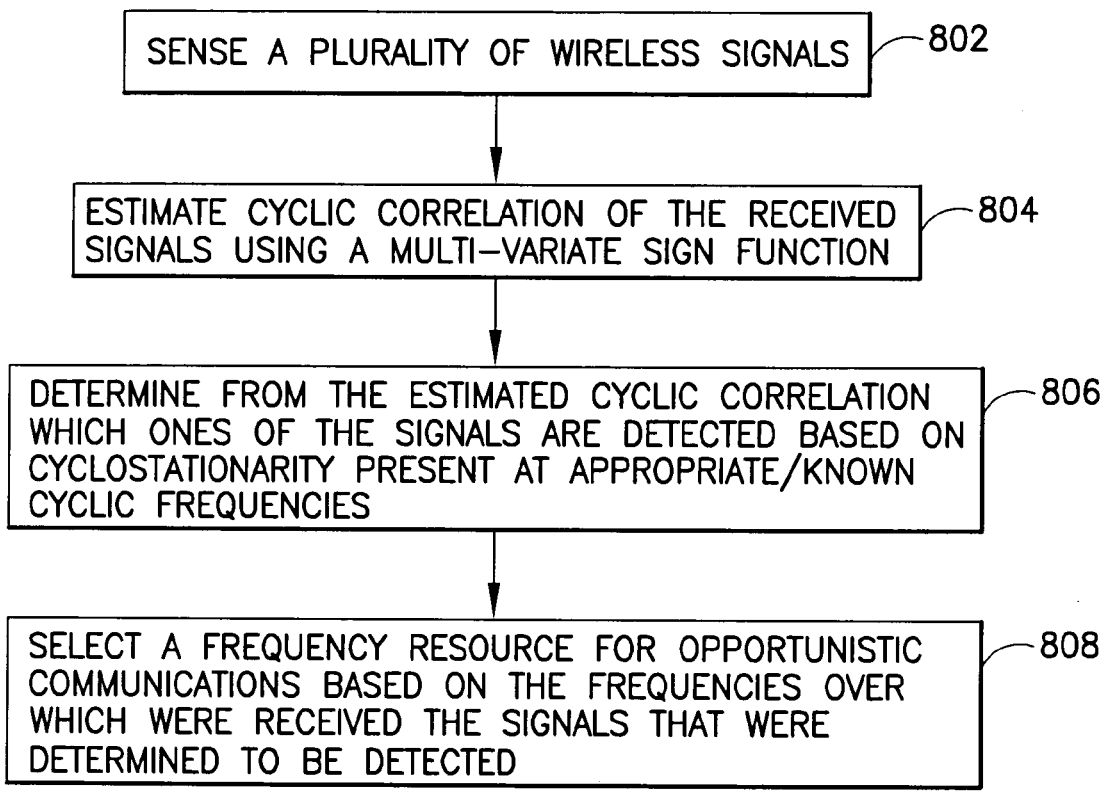
FIG. 8 is a logic flow diagram that illustrates the operation of a method, and a result of execution of computer program instructions embodied on a computer readable memory, in accordance with the exemplary embodiments of this invention.

According to an embodiment of the invention and as shown at FIG. 8 is an apparatus, a computer program product, and a method that include sensing a plurality K of wireless signals at block 802, estimating cyclic correlation of the received signals using a multi-variate sign function at block 804, determining from the estimated cyclic correlation which ones of the K signals are detected based on cyclostationarity present at appropriate (known) cyclic frequencies at block 806, and then opportunistically transmitting (or selecting for opportunistic transmissions) on a frequency resource that is selected based on frequency resources over which were received the signals that were determined to be detected at block 808. Note that the same hypothesis test of equation [1] can be made for either the primary user or for the secondary user or for any signal type depending on the choice of the cyclic frequency or set of cyclic frequencies of interest. Each signal type has a predefined set of cyclic frequencies for which it exhibits cyclostationarity properties. Based on which ones of the K signals are detected, a conclusion can be made whether the signal was or was not a primary user, and the frequency of that signal can be either avoided (if the conclusion is that the analyzed signal is a primary user signal) or used (if the conclusion is that the signal being analyzed is not a primary user signal). There may also be some higher layer decision in the cognitive radio network that certain frequencies deemed by the above cyclostationary analysis are not available, which the cognitive radio can also incorporate into its selection of which frequency it is available for its transmissions.

In particular embodiments of the above generalized approach, one or more of the following may also be employed: the signals determined to be detected are determined to be primary user signals (equivalently not secondary user signals) and the frequency resource selected for transmission is chosen so as to avoid the frequencies on which the primary user signals were received; the signals determined to be detected are determined to be secondary user signals (equivalently not primary user signals) and the frequency resource selected for transmission might or might not be chosen so as to occupy a frequency on which the secondary user signals were received; the sign function is bivariate; the determining that the sensed signals represent a cyclostationary signal at specified cyclic frequencies is testing whether the estimated cyclic correlation is different from zero for the cyclic frequencies of the signal; determining that the sensed signals represent a cyclostationary signal includes using a test statistic for a single secondary user, or in another embodiment it includes combining a plurality of single secondary users such as by summing a test statistic over the plurality (L) of users; distinguishing between secondary and primary user signals or different co-existing wireless system signals based on the different cyclic frequencies they exhibit. These and other aspects are detailed with particularity above, and in the attached Exhibit F.

In general, the various embodiments may be implemented in hardware or special purpose circuits, software (computer readable instructions embodied on a computer readable medium), logic or any combination thereof. While various aspects of the invention may be illustrated and described as block diagrams, flow charts, or other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:
1. A method comprising:
sensing a plurality of wireless signals received at a receiver;
estimating cyclic correlation of the received signals using a multi-variate sign function;
determining from the estimated cyclic correlation which ones of the signals are detected based on cyclostationarity present at known cyclic frequencies; and
based on the frequencies over which were received the detected signals, selecting a frequency resource for opportunistic communications.

2. The method according to claim 1, wherein the signals that are determined to be detected are at least one of primary user signals and secondary user signals; and the frequency resource selected for opportunistic communications is selected so as to avoid the frequencies over which were received the primary or secondary user signals.

3. The method according to claim 1, wherein the signals that are determined to be detected are secondary user signals and the known cyclic frequencies include at least cyclic frequencies characteristic of secondary users; and the frequency resource selected for opportunistic communications includes a frequency over which were received at least some of the secondary user signals.

4. The method according to claim 1, wherein the multi-variate sign function is bivariate.

5. The method according to claim 1, wherein estimating cyclic correlation of the received signals comprises determining that the sensed signals represent a cyclostationary signal at specified cyclic frequencies and testing whether the estimated cyclic correlation of the cyclostationary signal is different from zero for the specified cyclic frequencies.

6. The method according to claim 5, wherein determining that the sensed signals represent a cyclostationary signal comprises using a test statistic for a single secondary user.

7. The method according to claim 5, wherein determining that the sensed signals represent a cyclostationary signal comprises combining a plurality of single secondary users by summing a test statistic over the plurality of users.

8. The method according to claim 5, further comprising using different specific cyclic frequencies to distinguish between secondary and primary user signals or between different co-existing wireless system signals.

9. An apparatus comprising:
a receiver configured to sense a plurality of wireless signals;
a detector configured to estimate cyclic correlation of the received signals using a multi-variate sign function, and to determine from the estimated cyclic correlation which ones of the signals are detected based on cyclostationarity present at known cyclic frequencies; and
a processor configured to select a frequency resource for opportunistic communications based on the frequencies over which were received the signals that the detector determined are detected.

10. The apparatus according to claim 9, wherein the signals that the detector determines to be detected are at least one of primary user signals and secondary user signals;
and the frequency resource which the processor selects for opportunistic communications is selected so as to avoid the frequencies over which were received the primary or secondary user signals.

11. The apparatus according to claim 9, wherein the signals that the detector determines to be detected are secondary user signals and the known cyclic frequencies include cyclic frequencies characteristic of secondary users; and the frequency resource which the processor selects for opportunistic communications includes a frequency over which were received at least some of the secondary user signals.

12. The apparatus according to claim 9, wherein the multi-variate sign function is bivariate.

13. The apparatus according to claim 9, wherein the detector is configured to estimate cyclic correlation of the received signals by determining that the sensed signals represent a cyclostationary signal at specified cyclic frequencies and testing whether the estimated cyclic correlation of the cyclostationary signal is different from zero for the specified cyclic frequencies.

14. The apparatus according to claim 13, wherein the detector is configured to determine that the sensed signals represent a cyclostationary signal by using a test statistic for a single secondary user.

15. The apparatus according to claim 13, wherein the detector is configured to determine that the sensed signals represent a cyclostationary signal by combining a plurality of single secondary users via summing a test statistic over the plurality of users.

16. The apparatus according to claim 13, wherein the detector is further configured to use different specific cyclic frequencies to distinguish between secondary and primary user signals or between different co-existing wireless system signals.

17. A non-transitory computer readable memory storing a program of computer executable instructions that when executed by a processor result in actions comprising:
sensing a plurality of wireless signals;
estimating cyclic correlation of the received signals using a multi-variate sign function;
determining from the estimated cyclic correlation which ones of the signals are detected based on cyclostationarity present at known cyclic frequencies; and
based on the frequencies over which were received the detected signals, selecting a frequency resource for opportunistic communications.

18. An apparatus comprising:
receiving means for sensing a plurality of wireless signals;
detecting means for estimating cyclic correlation of the sensed signals using a multi-variate sign function, and for determining from the estimated cyclic correlation which ones of the signals are detected based on cyclostationarity present at known cyclic frequencies; and
selecting means for selecting a frequency resource for opportunistic communications based on the frequencies over which were received the signals that the detector determined are detected.

* * * * *